US012633846B2

(12) United States Patent
Chowdhury

(10) Patent No.: US 12,633,846 B2
(45) Date of Patent: May 19, 2026

(54) MULTILAYER ELECTROSTATIC PAD

(71) Applicant: The Boeing Company, Arlington, VA (US)

(72) Inventor: Nayeem Chowdhury, Melbourne (AU)

(73) Assignee: The Boeing Company, Arlington, VA (US)

( * ) Notice: Subject to any disclaimer, the term of this patent is extended or adjusted under 35 U.S.C. 154(b) by 173 days.

(21) Appl. No.: 18/489,479

(22) Filed: Oct. 18, 2023

(65) Prior Publication Data

US 2025/0132698 A1     Apr. 24, 2025

(51) Int. Cl.
*H02N 13/00* (2006.01)

(52) U.S. Cl.
CPC .................................... *H02N 13/00* (2013.01)

(58) Field of Classification Search
CPC ............... H01L 21/683; H01L 21/6833; H01L 21/6732; H02N 13/00
USPC ......................................................... 361/234
See application file for complete search history.

(56) References Cited

U.S. PATENT DOCUMENTS

| | | |
|---|---|---|
| 4,976,012 A | 12/1990 | McConnell |
| 5,151,277 A | 9/1992 | Bernardon et al. |
| 6,053,026 A | 4/2000 | Nardiello et al. |
| 6,830,712 B1 | 12/2004 | Roffman et al. |
| 9,561,602 B2 | 2/2017 | Jones et al. |
| 9,969,131 B2 | 5/2018 | Samak Sangari et al. |
| 10,538,451 B2 | 1/2020 | Angel et al. |
| 11,381,179 B2 * | 7/2022 | Cankurt .................... B03C 7/02 |
| 2003/0205334 A1 | 11/2003 | Sherrill et al. |
| 2007/0223173 A1 | 9/2007 | Fujisawa et al. |
| 2008/0211341 A1 * | 9/2008 | Pelrine ................. B62D 57/024 |
| | | 310/309 |
| 2008/0251975 A1 | 10/2008 | Gallagher et al. |
| 2010/0043511 A1 | 2/2010 | Forsyth |
| 2012/0134065 A1 * | 5/2012 | Furuya ................ H01L 21/6833 |
| | | 361/234 |
| 2019/0311933 A1 * | 10/2019 | White ................. H01L 21/6833 |
| 2020/0331214 A1 | 10/2020 | Vlavianos et al. |
| 2020/0398459 A1 | 12/2020 | Lehmann Madsen et al. |
| 2023/0286229 A1 | 9/2023 | Chowdhury |

FOREIGN PATENT DOCUMENTS

| | | |
|---|---|---|
| GB | 2467784 A | 8/2010 |
| JP | S58100696 A | 6/1983 |
| WO | 2012096982 A1 | 7/2012 |

(Continued)

OTHER PUBLICATIONS

Adapa A/S, Adaptive Moulds, "Double Curved Adaptive Moulds", User Manual, May 2021, pp. 1-24, Denmark.

(Continued)

*Primary Examiner* — Danny Nguyen
(74) *Attorney, Agent, or Firm* — Walters & Wasylyna LLC

(57) ABSTRACT

An electrostatic pad includes a first planar array of first electrodes arranged in a first pattern, and a second planar array of second electrodes arranged in a second pattern that is different from the first pattern, wherein the first and second planar arrays are disposed parallel to each other. A third layer of electrically insulative material may be sandwiched between the first and second planar arrays of respective first and second electrodes.

54 Claims, 9 Drawing Sheets

(56) References Cited

FOREIGN PATENT DOCUMENTS

| WO | 2020178387 A1 | 9/2020 |
| WO | 2020214120 A1 | 10/2020 |

OTHER PUBLICATIONS

Terekhov, I.V. et al., "Binders Used for Manufacturing of Composite Materials by Liquid Composite Molding", Polymers Journal, 2022, pp. 1-30, vol. 14, No. 87, MDPI, Switzerland.
Innovative Sensor Technology AG, "Micro Heaters", Switzerland, retrieved from https://www.ist-ag.com/en/micro-heaters.
Intellectual Property Office of the United Kingdom Combined Searcha and Examination Report, dated Aug. 7, 2023, regarding Application No. GB2302685.2, 8 pages.
European Patent Office, Extended European Search Report, App. No. 24202139.2 (Mar. 21, 2025).

* cited by examiner

MULTILAYER ELECTROSTATIC PAD

INTRODUCTION

This disclosure relates generally to electrostatic pads, and more particularly to electrostatic pads used for picking up dry carbon fiber sheets.

An electrostatic pad may be electrified to produce a voltage difference thereacross, which thereby presents an electrostatic adhesion potential across the pad. This electrostatic adhesion may then be used to attract and retain a dry carbon fabric sheet in contact with the pad, which may then be used to transport the sheet from one place to another. Once the sheet has been transported, the pad may be de-electrified, which causes the voltage difference and adhesion potential to diminish and the sheet to drop from the pad.

This process may be repeated for other carbon sheets, which can be useful in two-dimensional (2D) and three-dimensional (3D) pick-and-place operations. However, conventional approaches and electrostatic pad designs used in this process have limitations in terms of the adhesion strength developed.

SUMMARY

According to one embodiment, an electrostatic pad includes a first planar array of first electrodes arranged in a first pattern, and a second planar array of second electrodes arranged in a second pattern that is different from the first pattern, wherein the first and second planar arrays are disposed parallel to each other.

In this embodiment, one of the first and second planar arrays may be disposed directly above the other of the first and second planar arrays. The first electrodes may have a first polarity and the second electrodes may have a second polarity that is opposite the first polarity.

The electrostatic pad may further include a third layer of electrically insulative material sandwiched between the first and second planar arrays. The third layer may be in contact with each of the first and second planar arrays of respective first and second electrodes, and the third layer may be in contact with respective first and second edges of the first and second electrodes. The third layer may have a third layer thickness of approximately 25 microns.

The second pattern may be an inverse of the first pattern. Additionally, the first and second patterns may be first and second checkerboard patterns, respectively.

The electrostatic pad may further include one or more first electrical leads in electrical communication with the first electrodes and one or more second electrical leads in electrical communication with the second electrodes. The first and second planar arrays of respective first and second electrodes may be configured to provide a voltage difference therebetween, and selected ones of the first and second electrodes may be electrified by the respective one or more first and second electrical leads.

The first pattern may include a plurality of first rows and first columns defining mutually orthogonal first and second directions, and each of the first electrodes may have a first length as measured along the first direction and a first width as measured along the second direction. In this arrangement, first electrodes that are adjacent to each other in the first direction may be spaced apart from each other by a first spacing, and first electrodes that are adjacent to each other in the second direction may be spaced apart from each other by a second spacing, wherein the first spacing may be equal to the first length plus twice a gap amount, and wherein the second spacing may be equal to the first width plus twice the gap amount.

The electrostatic pad may further include a third layer of electrically insulative material sandwiched between the first and second planar arrays, wherein the third layer may have a third layer thickness and wherein the gap amount may be approximately ten times the third layer thickness. Optionally, the gap amount may be 0.3 millimeters. The first and second spacings may allow greater than 1.3 kV of voltage difference to be applied between the first and second planar arrays of respective first and second electrodes without arcing between adjacent ones of the first and second electrodes.

First or second electrodes that are diagonally adjacent to each other may be spaced apart from each other by a diagonal spacing that is less than twice the first or second spacing. Optionally, the first and second spacings may be equal to each other, with first or second electrodes that are diagonally adjacent to each other being spaced apart from each other by a diagonal spacing that is less than twice the first or second spacing. Gaps between adjacent ones of the first electrodes and between adjacent ones of the second electrodes may be filled with electrically insulative material.

The first pattern may include a plurality of first filled cells and a plurality of first empty cells, wherein each of the first electrodes is disposed in a respective one of the first filled cells, and the second pattern may include a plurality of second filled cells and a plurality of second empty cells, wherein each of the second electrodes is disposed in a respective one of the second filled cells. Each second empty cell may be disposed above a respective one of the first filled cells, and each second filled cell may be disposed above a respective one of the first empty cells.

According to another embodiment, a method of electrostatic adhesion between an electrostatic pad and a sheet of material includes: (i) generating an electric field of alternating positive and negative charges induced on respective first and second electrodes arranged on the electrostatic pad in respective first and second planar arrays that are offset from each other; (ii) bringing the electrostatic pad near or in contact with the sheet; (iii) setting up opposing charges on the sheet due to the electric field; and (iv) electrostatically adhering the sheet to the electrostatic pad.

In this method, the opposing charges on the sheet may be opposite in polarity from the alternating positive and negative charges induced on the respective first and second electrodes.

According to yet another embodiment, an electrostatic pad includes: (i) a first layer of first electrodes arranged in a first pattern of first filled cells and first empty cells, wherein each of the first electrodes is disposed in a respective one of the first filled cells; (ii) a second layer of second electrodes arranged in a second pattern of second filled cells and second empty cells, wherein each of the second electrodes is disposed in a respective one of the second filled cells; and (iii) a third layer of electrically insulative material sandwiched between the first and second layers. Here, the second pattern is an inverse of the first pattern, and the second layer is oriented above and generally parallel with the first layer.

In this embodiment, the first and second patterns may be first and second checkerboard patterns, respectively. Each second empty cell may be disposed above a respective one of the first filled cells, and each second filled cell may be disposed above a respective one of the first empty cells. The third layer may be in contact with each of the first and second layers, and the third layer may be in contact with respective first and second edges of the first and second electrodes.

The electrostatic pad may further include one or more first electrical leads in electrical communication with the first electrodes and one or more second electrical leads in electrical communication with the second electrodes. Additionally, the third layer may have a third layer thickness of approximately 25 microns.

In this arrangement, the first and second layers of respective first and second electrodes may be configured to provide a voltage difference therebetween. One of the first and second layers may be configured as a positive polarity layer, and the other of the first and second layers may be configured as a negative polarity layer. Selected ones of the first and second electrodes may be electrified by the respective one or more first and second electrical leads.

In this embodiment, the first pattern may include a plurality of first rows and first columns defining mutually orthogonal first and second directions, each of the first electrodes may have a first length as measured along the first direction and a first width as measured along the second direction, first electrodes that are adjacent to each other in the first direction may be spaced apart from each other by a first spacing, and first electrodes that are adjacent to each other in the second direction may be spaced apart from each other by a second spacing, wherein the first spacing is equal to the first length plus twice a gap amount and wherein the second spacing is equal to the first width plus twice the gap amount. The third layer may have a third layer thickness, and the gap amount may be approximately ten times the third layer thickness. Optionally, the gap amount may be 0.3 millimeters. The first and second spacings may allow greater than 1.3 kV of voltage difference to be applied between the first and second layers of respective first and second electrodes without arcing between adjacent ones of the first and second electrodes.

First or second electrodes that are diagonally adjacent to each other may be spaced apart from each other by a diagonal spacing that is less than twice the first or second spacing. Additionally, the first and second spacings may be equal to each other, with first or second electrodes that are diagonally adjacent to each other being spaced apart from each other by a diagonal spacing that is less than twice the first or second spacing. Further, gaps between adjacent ones of the first electrodes and between adjacent ones of the second electrodes may be filled with electrically insulative material.

According to a further embodiment, an electrostatic pad includes a first layer of first electrodes arranged in a first planar array, a second layer of second electrodes arranged in a second planar array, and a third layer of electrically insulative material sandwiched between the first and second layers. The first planar array has a plurality of first rows and a plurality of first columns defining a plurality of first cells, wherein each of the first electrodes occupies a respective one of the first cells such that the first electrodes are disposed in a first pattern. The second planar array has a plurality of second rows and a plurality of second columns defining a plurality of second cells, wherein each of the second electrodes occupies a respective one of the second cells such that the second electrodes are disposed in a second pattern that is an inverse of the first pattern, wherein the second layer is disposed above and generally parallel with the first layer.

The first and second patterns may be first and second checkerboard patterns, respectively. The first pattern may include a plurality of first filled cells and a plurality of first empty cells, wherein each of the first electrodes is disposed in a respective one of the first filled cells, and the second pattern may include a plurality of second filled cells and a plurality of second empty cells, wherein each of the second electrodes is disposed in a respective one of the second filled cells. In this arrangement, each second empty cell may be disposed above a respective one of the first filled cells, and each second filled cell may be disposed above a respective one of the first empty cells.

The electrostatic pad may further include one or more first electrical leads in electrical communication with the first electrodes and one or more second electrical leads in electrical communication with the second electrodes. Here, the first and second layers of respective first and second electrodes may be configured to provide a voltage difference therebetween.

The first rows and first columns may define mutually orthogonal first and second directions, each of the first electrodes may have a first length as measured along the first direction and a first width as measured along the second direction, first that are adjacent to each other in the first direction may be spaced apart from each other by a first spacing that is equal to the first length plus twice a gap amount, and first electrodes that are adjacent to each other in the second direction may be spaced apart from each other by a second spacing that is equal to the first width plus twice the gap amount. The third layer may have a third layer thickness, and the gap amount may be approximately ten times the third layer thickness. Optionally, the gap amount may be 0.3 millimeters.

According to yet a further embodiment, an electrostatic pad includes: (i) a first planar array of first filled cells and first empty cells arranged in a first pattern, wherein a respective first electrode is disposed within each of the first filled cells, thereby defining a first layer of first electrodes; (ii) a second planar array of second filled cells and second empty cells arranged in a second pattern that is an inverse of the first pattern, wherein a respective second electrode is disposed within each of the second filled cells, thereby defining a second layer of second electrodes, wherein the second layer is oriented above and generally parallel with the first layer; and (iii) a third layer of electrically insulative material sandwiched between and in contact with the first and second layers. Here, each second empty cell is disposed above a respective one of the first filled cells, and each second filled cell is disposed above a respective one of the first empty cells.

The electrostatic pad may further include one or more first electrical leads in electrical communication with the first electrodes and one or more second electrical leads in electrical communication with the second electrodes. In this arrangement, the first and second layers of respective first and second electrodes may be configured to provide a voltage difference therebetween.

In this embodiment, the first and second patterns may be first and second checkerboard patterns, respectively. The first pattern may include a plurality of first rows and first columns defining mutually orthogonal first and second directions, each of the first electrodes may have a first length as measured along the first direction and a first width as measured along the second direction, first electrodes that are adjacent to each other in the first direction may be spaced apart from each other by a first spacing that is equal to the first length plus twice a gap amount, and first electrodes that are adjacent to each other in the second direction may be spaced apart from each other by a second spacing that is equal to the first width plus twice the gap amount. The third layer may have a third layer thickness, and the gap amount may be approximately ten times the third layer thickness. Optionally, the gap amount may be 0.3 millimeters.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Figure 1:
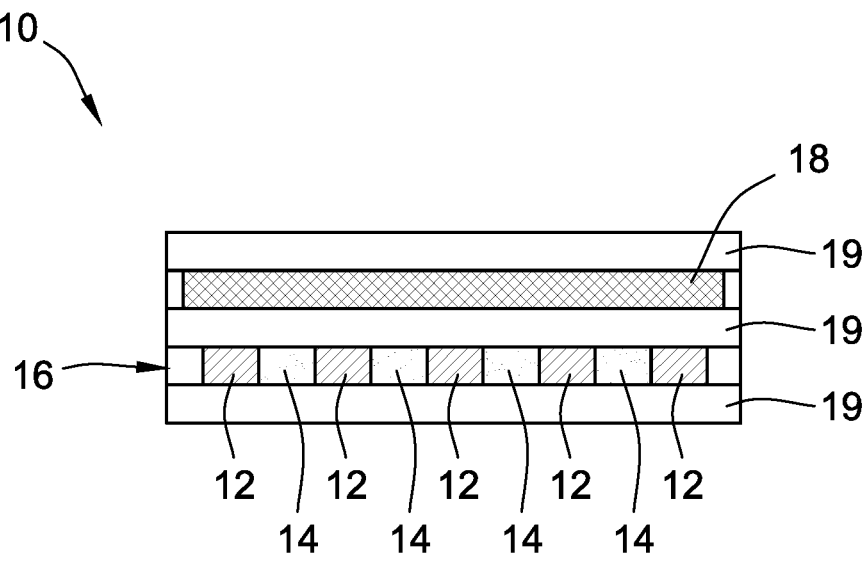
FIG. 1 is a schematic side view of an electrostatic pad in accordance with a conventional approach.

Referring now to the drawings, wherein like numerals indicate like parts in the several views, various configurations of a multilayer electrostatic pad 20 are shown and described herein.

Figure 2:
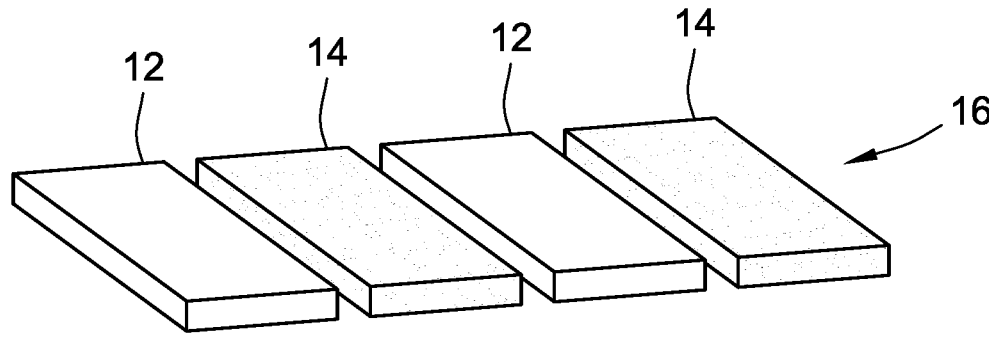
FIGS. 2-3 are schematic perspective and side views, respectively, of the electrodes shown in FIG. 1.
Figure 3:
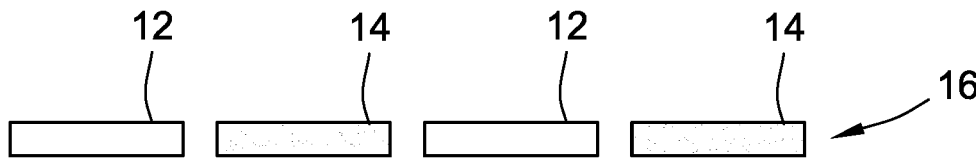

FIG. 1 shows a schematic side view of an electrostatic pad 10 in accordance with a conventional approach, and FIGS. 2-3 are schematic perspective and side views, respectively, of first and second electrodes 12, 14 that are shown in FIG. 1. As shown in the drawings, the conventional electrostatic pad 10 includes an alternating sequence of first electrodes 12 and second electrodes 14, all arranged on a single row, plane or layer 16. Note that while the layer 16 of first and second electrodes 12, 14 is shown only along one direction or dimension, it may be appreciated that the alternating positive-negative sequence of first and second electrodes 12, 14 may extend in a plane along two orthogonal directions or dimensions.

The layer 16 of first and second electrodes 12, 14 may have an electrically insulative layer 19 both above and below this layer 16, with an optional heater 18 (such as a positive temperature coefficient or PTC heater) disposed along a row or plane above the layer 16 of first and second electrodes 12, 14. Also note that while FIG. 1 shows the first and second electrodes 12, 14 having no spacing or other material between adjacent ones of the first and second electrodes 12, 14, FIGS. 2-3 show that there may be some spacing provided between adjacent first and second electrodes 12, 14 that are in this layer 16.

While not shown in FIGS. 1-3, a plurality of electrical leads are attached to the individual first and second electrodes 12, 14, with some electrodes (e.g., the first electrodes 12) being wired to be "positive" electrodes and other electrodes (e.g., the second electrodes 14) being wired to be "negative" electrodes, or vice versa. Note here that the designation of some electrodes being "positive" and others being "negative" may refer to the actual polarity of the electrodes—such as the "positive" electrodes having +100 volts of potential and the "negative" electrodes having -100 volts of potential—or, the designation may refer to the relative potential difference between them—such as the "positive" electrodes having a higher voltage (e.g., +200 volts) than the "negative" electrodes (e.g., 0 volts).

When the first and second electrodes 12, 14 are electrified via the electrical leads, a voltage difference $\Delta V$ is generated between neighboring first and second electrodes 12, 14 and across the layer 16 of first and second electrodes 12, 14, such that an electrostatic charge or potential is thereby generated. Then, once this electrostatic potential has been generated, the electrostatic pad 10 may be brought into close proximity or direct contact with one or more sheets of dry carbon fabric, and a sheet of carbon fabric will be attracted to the electrostatic pad 10 due to electrostatic attraction or adhesion. Once a carbon sheet has been electrostatically attracted to the electrostatic pad 10, the electrostatic pad 10 may then be lifted and moved, and the carbon sheet will remain adhered to the electrostatic pad 10, thus facilitating the picking up and moving of the carbon sheets.

In contrast with the abovementioned conventional electrostatic pad 10, the electrostatic pad 20 of the present disclosure solves the technical problem of weak electrostatic adhesion strength, by the technical effect of separating the positive and negative electrodes into two separate layers or 2D planar arrays, thereby providing significant benefits and technical advantages which are not taught or suggested by the foregoing conventional approach. These benefits and technical advantages include the use of structural elements and features which offer higher electrostatic adhesion strength as compared to previous approaches.

Figure 4:
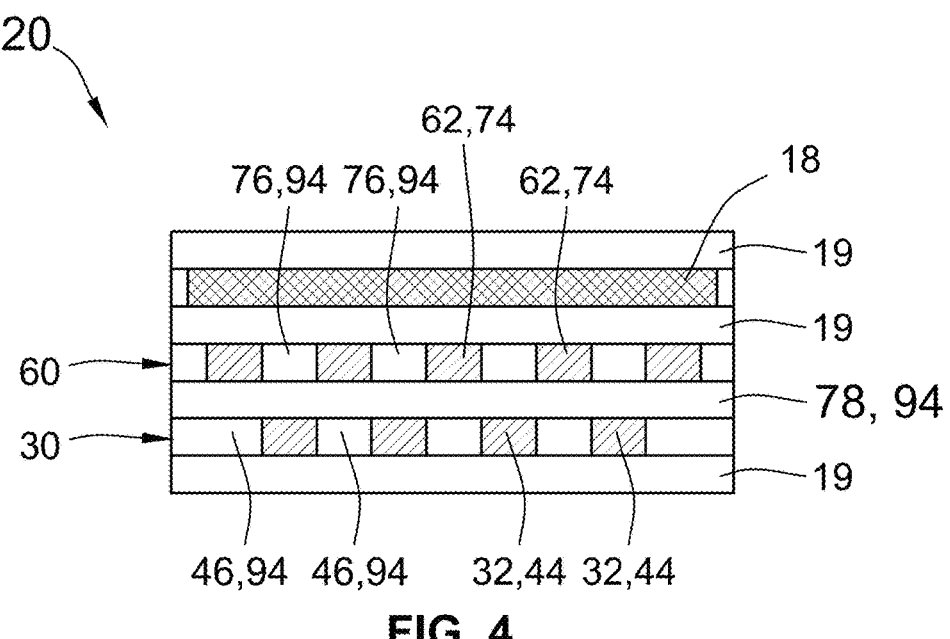
FIG. 4 is a schematic side view of an electrostatic pad in accordance with the present disclosure.
Figure 5:
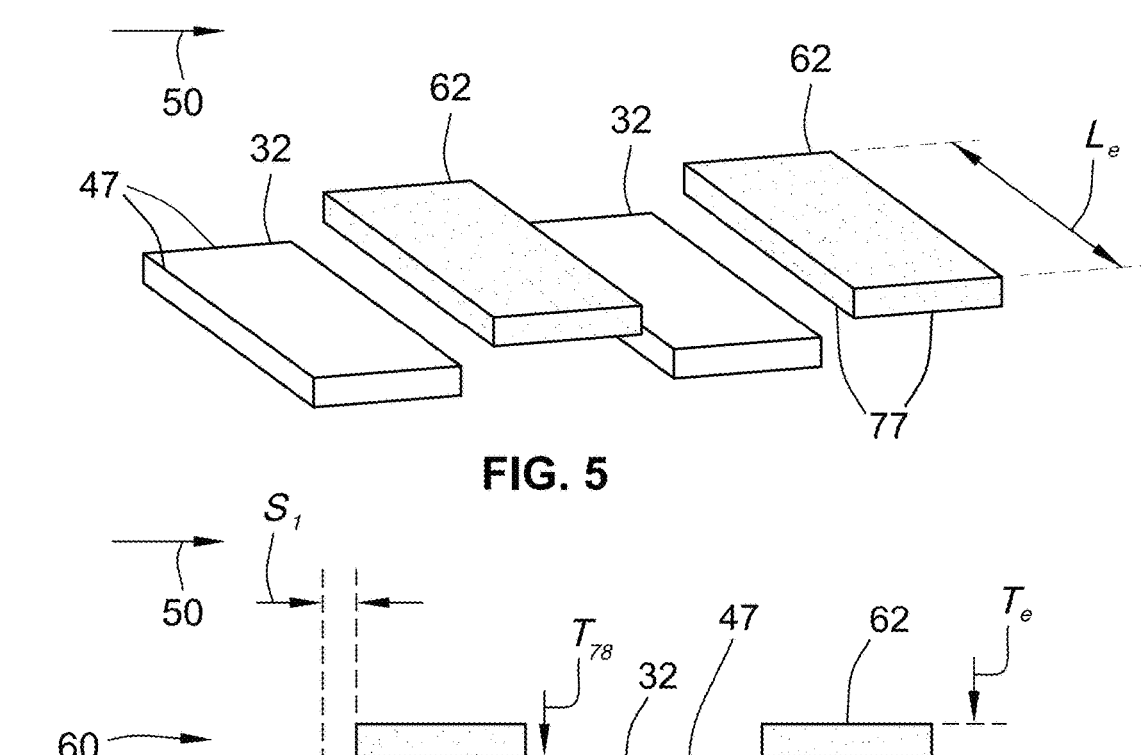
FIGS. 5-6 are schematic perspective and side views, respectively, of the electrodes shown in FIG. 4.
Figure 6:
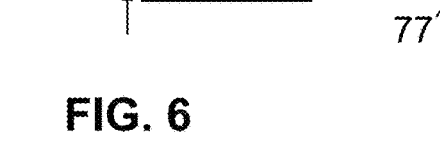

FIG. 4 shows a schematic side view of an electrostatic pad 20 in accordance with the present disclosure, and FIGS. 5-6 are schematic perspective and side views, respectively, of the first and second electrodes 32, 62 shown in FIG. 4. As shown in the drawings, the electrostatic pad 20 includes a first layer 30 of first electrodes 32, a second layer 60 of second electrodes 62 oriented above and generally parallel with the first layer 30, and a third layer 78 of electrically insulative material 94 sandwiched between the first and second layers 30, 60. Note that while the first and second layers 30, 60 of first and second electrodes 32, 62 are shown along only one direction or dimension in FIGS. 4-6, it may be appreciated that the first and second electrodes 32, 62 may also extend in a plane along two orthogonal directions or dimensions, as described in more detail below.

In addition to the third layer 78 of electrically insulative material 94 between the first and second layers 30, 60, additional electrically insulative layers 19 may be disposed below the first layer 30 and above the second layer 60, with an optional heater 18 (such as a PTC heater) disposed above the second layer 60. These additional electrically insulative layers 19 may optionally be made of the same electrically insulative material 94 that the third layer 78 is made of.

Additionally, gaps 79 that are between adjacent ones of the first electrodes 32 and between adjacent ones of the second electrodes 62 may be filled with electrically insulative material 94.

As shown by FIGS. 4-6, the first and second electrodes 32, 62 are separated into two respective first and second layers 30, 60, with each of the first and second electrodes 32, 62 optionally having a uniform length $L_e$, width $W_e$ and thickness $T_e$. For example, each of the first and second electrodes 32, 62 may be generally rectangular in shape, with dimensions of about 20 millimeters in length $L_e$, about 5 millimeters in width $W_e$, and about 100 microns in thickness $T_e$. Any corners of the first and second electrodes 32, 62 may be rounded, so as to minimize or avoid stress concentrations that may be associated with sharp corners. (For example, see the radius R that is applied to the first and second electrodes 32, 62 in FIG. 13.) Additionally, the third layer 78 may have a third layer thickness $T_{78}$ of approximately 25 microns. (Note that the drawings herein are schematic in nature, so the features and dimensions shown are for illustrative purposes and are not necessarily drawn to scale.)

Turning now to FIGS. 7-11, various schematic diagrams are shown illustrating first and second planar arrays 36, 66 of first and second cells 42, 72. Each of the first and second planar arrays 36, 66 may be viewed as a 2D array or grid of respective first and second cells 42, 72. Note that while only 4×4 arrays or grids are shown in these drawings, it may be appreciated that this is only for illustrative purposes, and that much larger arrays or grids may be provided.

Figures 7, 8, 9, 10:
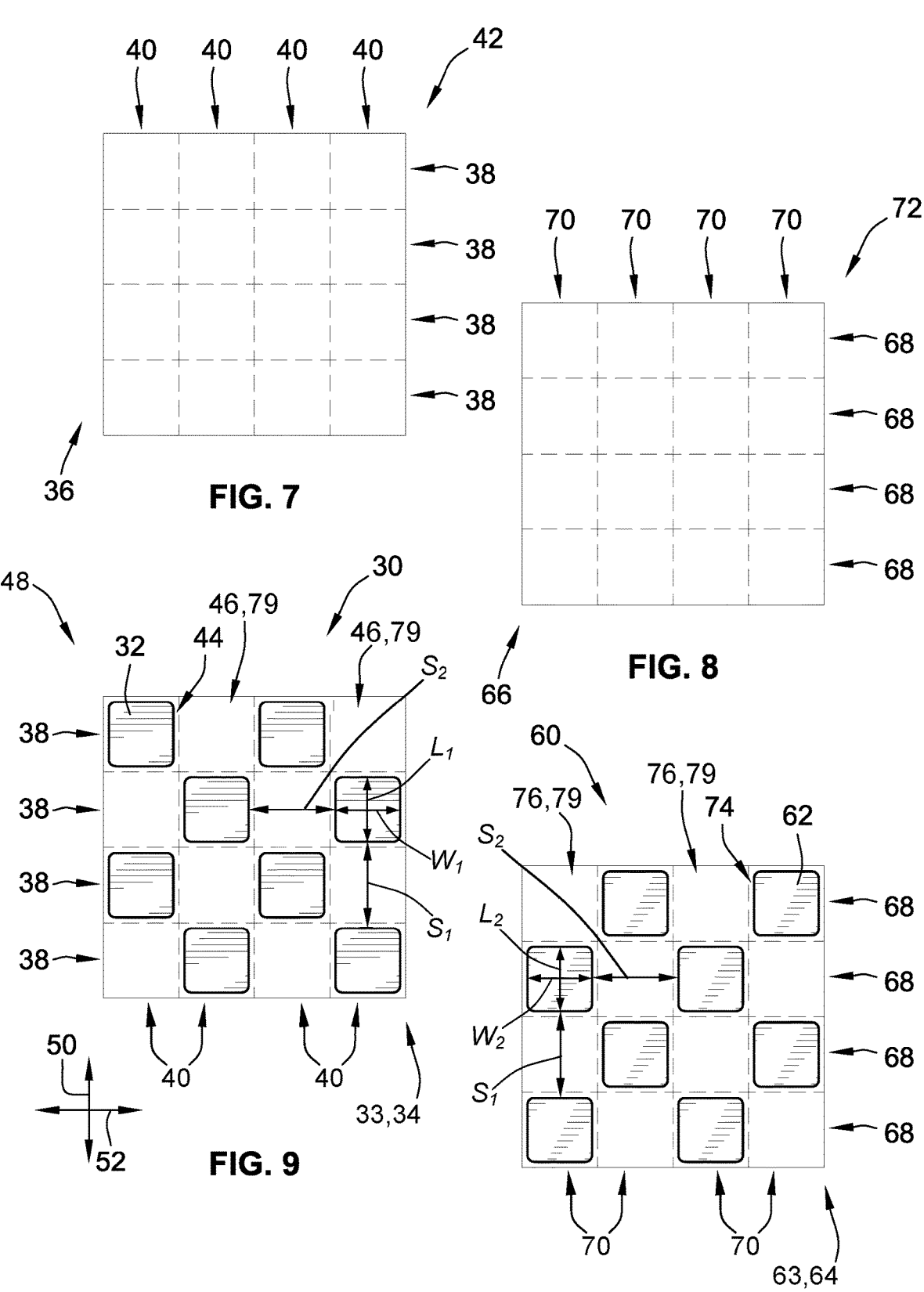
FIGS. 7-8 are schematic diagrams of respective first and second planar arrays of cells.
FIGS. 9-10 are schematic diagrams of respective first and second checkerboard patterns selectively populated with respective first and second electrodes.

FIG. 7 shows the first planar array 36, which has a plurality of first rows 38 and a plurality of first columns 40, which intersect to define a plurality of first cells 42. Similarly, FIG. 8 shows the second planar array 66, which has a plurality of second rows 68 and a plurality of second columns 70, which intersect to define a plurality of second cells 72. Each of the first and second cells 42, 72 has a respective unique "grid location" within the respective first or second planar array 36, 66, which may be designated by the cell's row number and column number.

FIGS. 9-10 show diagrams of the first and second electrodes 32, 62, respectively, where the first electrodes 32 are disposed within selected ones of the first cells 42 in a first pattern 33 which is a first checkerboard pattern 34, and the second electrodes 62 are disposed within selected ones of the second cells 72 in a second pattern 63 which is a second checkerboard pattern 64. As shown in the drawings, the first pattern 33 may be a first checkerboard pattern 34 which is an alternating, repeating pattern of first filled cells 44 and first empty cells 46, and the second pattern 63 may be a second checkerboard pattern 64 which is also an alternating, repeating pattern of second filled cells 74 and second empty cells 76. Each of the first electrodes 32 is disposed in a respective one of the first filled cells 44, and each of the second electrodes 62 is disposed in a respective one of the second filled cells 74, with the first and second empty cells 46, 76 being devoid of any first or second electrodes 32, 62 disposed therein.

However, note that the second checkerboard pattern 64 is an inverse of the first checkerboard pattern 34. That is, a first cell 42 that is a first filled cell 44 at a given grid location in the first checkerboard pattern 34 will correspond with a second cell 72 that is a second empty cell 76 at a corresponding grid location in the second checkerboard pattern 64. Similarly, a first cell 42 that is a first empty cell 46 at a given grid location in the first checkerboard pattern 34 will correspond with a second cell 72 that is a second filled cell 74 at a corresponding grid location in the second checkerboard pattern 64. Thus, the first electrodes 32 of the first layer 30 are arranged in a first checkerboard pattern 34 of first filled cells 44 and first empty cells 46, and the second electrodes 62 in the second layer 60 are arranged in a second checkerboard pattern 64 of second filled cells 74 and second empty cells 76, wherein the first and second checkerboard patterns 34, 64 are inverses of each other.

Returning to FIG. 9, note that the first checkerboard pattern 34 has an alternating pattern of first filled cells 44 and first empty cells 46—i.e., a first filled cell-first empty cell pattern 48—which repeats in two mutually orthogonal or perpendicular directions; namely, the leftward-rightward direction and the upward-downward direction. Thus, the first checkerboard pattern 34 defines mutually orthogonal first and second directions 50, 52 in which the first filled cell-first empty cell pattern 48 repeats in both the first direction 50 and in the second direction 52. Alternatively, FIG. 9 may be viewed as a first pattern 33 which includes a plurality of first rows 38 and first columns 40, which define the first and second directions 50, 52.

Figures 11, 12:
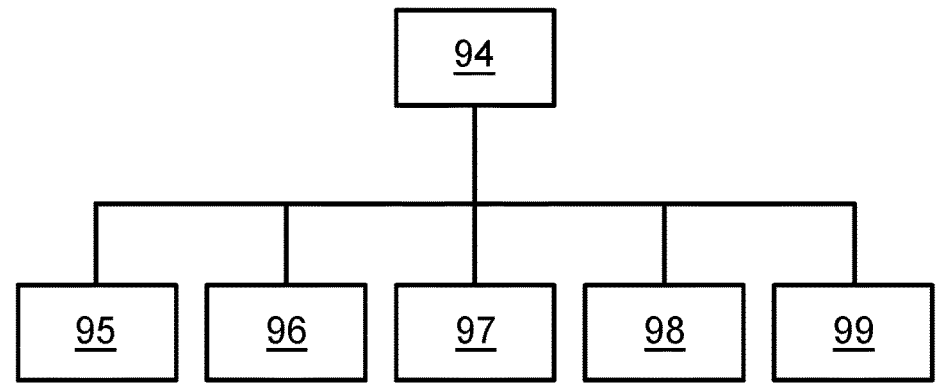
FIG. 11 is a schematic diagram of the second checkerboard pattern of second electrodes superimposed onto the first checkerboard pattern of first electrodes.
FIG. 12 is a block diagram illustrating various electrically insulative materials.

FIG. 11 shows a diagram of the second layer 60, second planar array 66, second pattern 63 and/or second checkerboard pattern 64 of second electrodes 62 superimposed onto the first layer 30, first planar array 36, first pattern 33 and/or first checkerboard pattern 34 of first electrodes 32. Here, each second empty cell 76 is disposed above a respective one of the first filled cells 44, and each second filled cell 74 is disposed above a respective one of the first empty cells 46.

As shown in FIGS. 9-11, each of the first electrodes 32 may have a first length $L_1$ as measured along the first direction 50 and a first width $W_1$ as measured along the second direction 52. Similarly, each of the second electrodes 62 may have a second length $L_2$ as measured along the first direction 50 and a second width $W_2$ as measured along the second direction 52. In some configurations, the dimensions of the first electrodes 32 may be the same as the dimensions of the second electrodes 62; i.e., $L_1=L_2$ and $W_1=W_2$. First electrodes 32 that are adjacent to each other in the first direction 50 may be spaced apart from each other (along the first direction 50) by a first spacing $S_1$, and first electrodes 32 that are adjacent to each other in the second direction 52 may be spaced apart from each other (along the second direction 52) by a second spacing $S_2$. (Optionally, as illustrated in FIG. 10, second electrodes 62 that are adjacent to each other in the first direction 50 may also be spaced apart from each other (along the first direction 50) by the first spacing $S_1$, and second electrodes 62 that are adjacent to each other in the second direction 52 may be spaced apart from each other (along the second direction 52) by the second spacing $S_2$.)

The first spacing $S_1$ may be equal to the first length $L_1$ plus twice a gap amount G, and the second spacing $S_2$ may be equal to the first width $W_1$ plus twice the gap amount G. The gap amount G may be approximately ten times the third layer thickness $T_{78}$, or about 0.3 millimeters. Optionally, the first and second spacings $S_1$, $S_2$ may be equal to each other. The first and second spacings $S_1$, $S_2$ may allow greater than 1.3 kV of voltage difference $\Delta V$ to be applied between the first and second layers 30, 60 of respective first and second electrodes 32, 62 without arcing between adjacent ones of the first and second electrodes 32, 62.

FIG. 12 shows a block diagram illustrating various candidates for the electrically insulative material 94 which the third layer 78 (and optionally the other electrically insulative layers 19) is made of. For instance, the electrically insulative material 94 may be polyethylene terephthalate (PET) 95, polyacetate 96, polyimide 97, FR-4 98, some other electrically insulative material 99, or any combination of these. The third layer 78 may be in contact with each of the first and second layers 30, 60, and the third layer 78 may be in contact with respective first and second edges 47, 77 of the first and second electrodes 32, 62.

Figure 13:
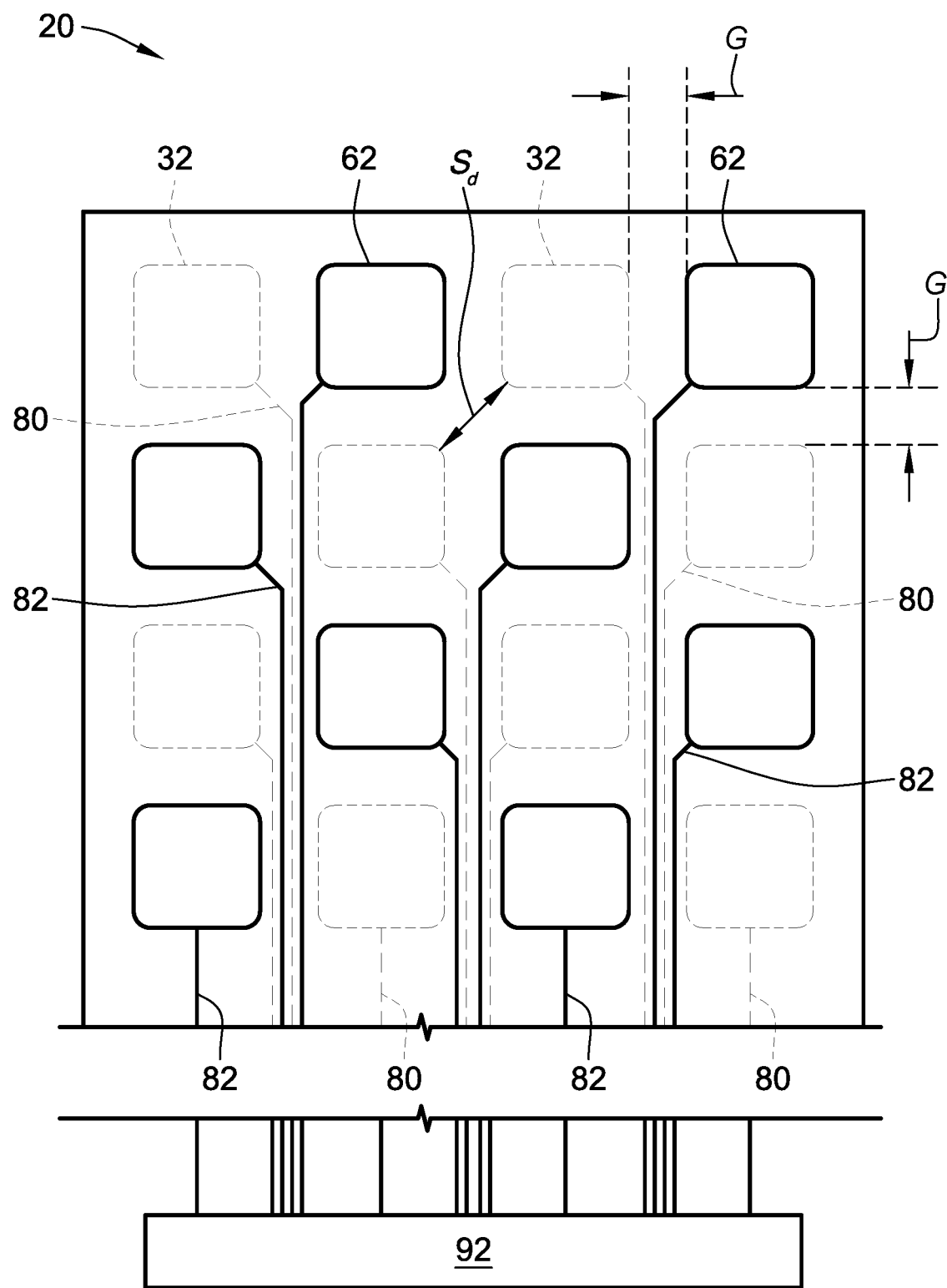
FIGS. 13-15 are schematic diagrams of various wiring schemes for the first and second electrodes.
Figure 14:
Figure 15:

FIGS. 13-15 show schematic diagrams of various wiring or circuit trace schemes for the first and second electrodes 32, 62. The writing or traces may include one or more first electrical leads 80 in electrical communication with the first electrodes 32 and one or more second electrical leads 82 in electrical communication with the second electrodes 62.

In FIG. 13, each individual first electrode 32 has its own respective first electrical lead 80, and each individual second electrode 62 has its own respective second electrical lead 82. These first and second electrical leads 80, 82 may be operatively connected with a controller 92 which is configured for turning each individual first or second electrode 32, 62 on or off according to a control scheme. Note that first or second electrodes 32, 62 that are diagonally adjacent to each other may be spaced apart from each other by a diagonal spacing $S_d$; in some embodiments, this diagonal spacing $S_d$ may be less than twice the first or second spacing $S_1$, $S_2$.

In FIG. 14, the first electrodes 32 in each column are connected together by a common first electrical lead 80 for that column, and the second electrodes 62 in each column are connected together by a common second electrical lead 82 for that column. Thus, in this arrangement, fewer first and second electrical leads 80, 82 are used than with the arrangement shown in FIG. 13, and the controller 92 may be used to activate or deactivate the first and second electrodes 32, 62 on a column-by-column basis.

In FIG. 15, all of the first electrodes 32 are connected together by a single first electrical lead 80, and all of the second electrodes 62 are connected together by a single second electrical lead 82. In this particular arrangement, even fewer first and second electrical leads 80, 82 are used than with the arrangements shown in FIGS. 13-14, and the controller 92 may be used to activate or deactivate all of the first electrodes 32 at once and all of the second electrodes 62 at once.

Note that while FIGS. 13-15 show only one first or second electrical lead 80, 82 connected with each first or second electrode 32, 62, each one first or second electrical lead 80, 82 may actually include two or more leads, such as a power lead and a ground or neutral lead. Alternatively, one or more ground planes (not shown) may be provided to which each first or second electrode 32, 62 is connected. Also, note that while only one electrostatic pad 20 is shown connected with the controller 92 in these drawings (for the sake of simplicity), it is possible that multiple electrostatic pads 20 may be operatively connected with a single controller 92, or that multiple controllers 92 may be used. Optionally, and depending upon the wiring scheme used, selected ones of the first and second electrodes 32, 62 may be activated and deactivated (i.e., turned on and off) by the controller(s) 92 to which the first and second electrodes 32, 62 are attached.

Figures 16, 17:
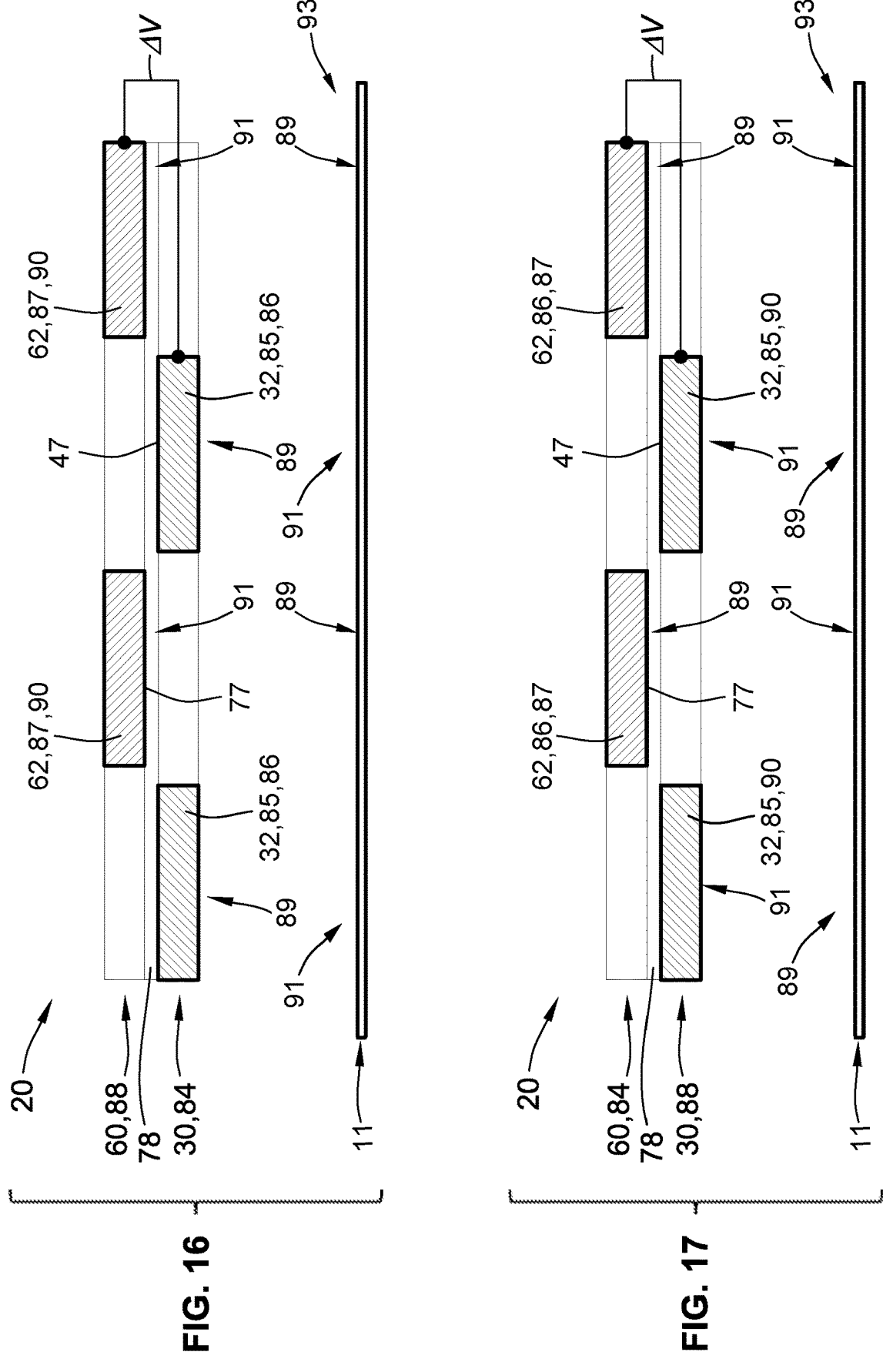
FIG. 16 is a schematic side view of the first and second layers of electrodes, where the first and second layers are positive and negative polarity layers, respectively.
FIG. 17 is a schematic side view of the first and second layers of electrodes, where the first and second layers are negative and positive polarity layers, respectively.

FIGS. 16-17 show schematic side views of the first and second layers 30, 60 of first and second electrodes 32, 62, in which one of the first and second layers 30, 60 may be a positive polarity layer 84 and the other may be a negative polarity layer 88. In FIG. 16, the first layer 30 is a positive polarity layer 84 and the first electrodes 32 are positive electrodes 86, while the second layer 60 is a negative polarity layer 88 and the second electrodes 62 are negative electrodes 90. Conversely, in FIG. 17, the first layer 30 is a negative polarity layer 88 and the first electrodes 32 are negative electrodes 90, while the second layer 60 is a positive polarity layer 84 and the second electrodes 62 are positive electrodes 86. In these arrangements, the first and second layers 30, 60 of respective first and second electrodes 32, 62 may be configured and electrified so as to produce a desired voltage difference $\Delta V$ or electrostatic potential therebetween.

While the first and second patterns 33, 63 have been illustrated in the drawings as first and second checkerboard patterns 34, 64, respectively, it may be noted that the first and second patterns 33, 63 may assume other patterns besides the first and second checkerboard patterns 34, 64.

Figure 18:
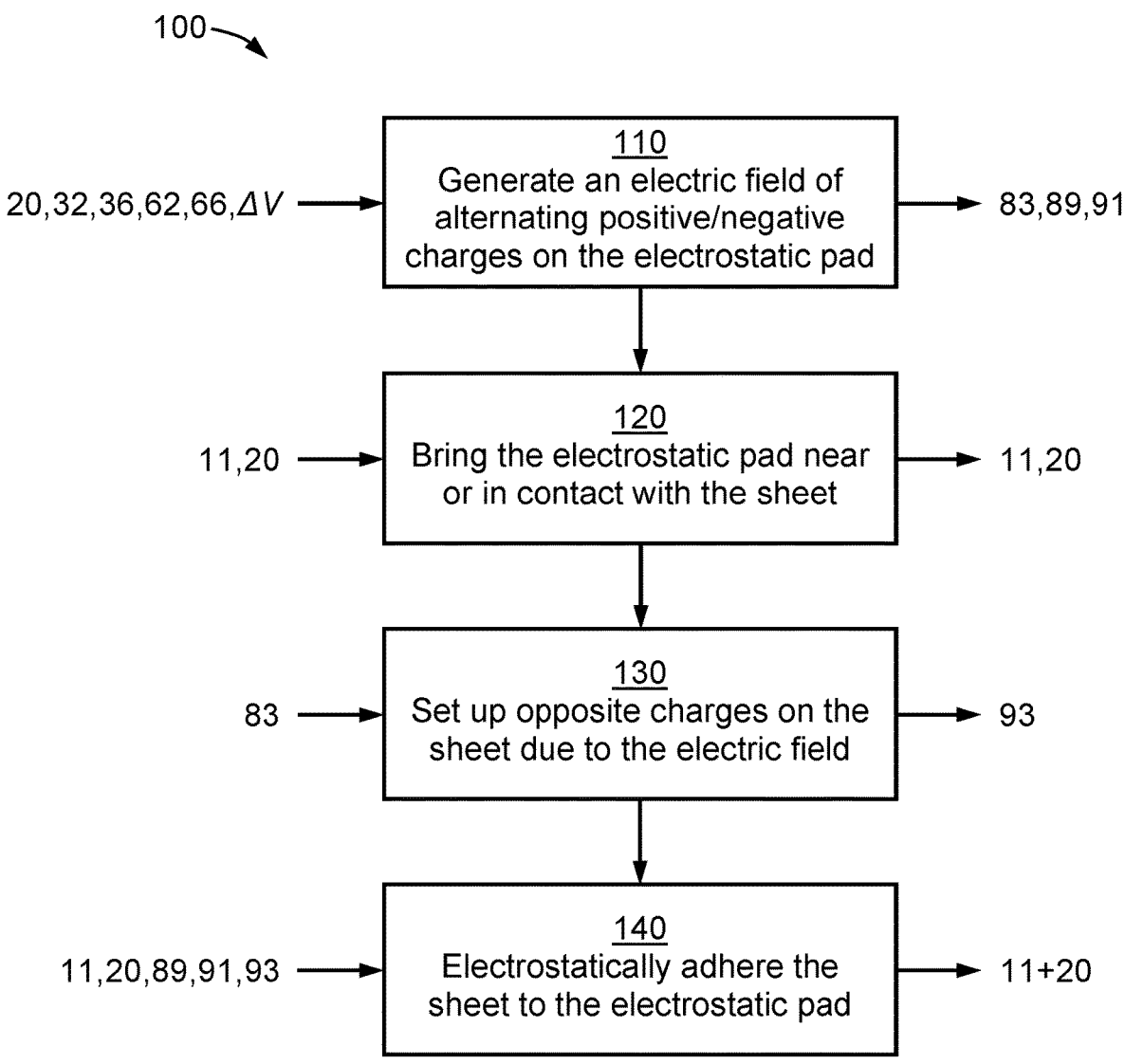
FIG. 18 is a flowchart of steps for a method of electrostatic adhesion.

FIG. 18 shows a flowchart of steps for a method 100 of electrostatic adhesion between an electrostatic pad 20 and a sheet 11 of material. Note that the ingredients or inputs for each block or step are shown to the left of each block or step, and the results or outputs produced by each block or step are shown to the right of each block or step. At block 110, an electric field 83 is generated of alternating positive and negative charges 89, 91 induced on respective first and second electrodes 32, 62 arranged on the electrostatic pad 20 in respective first and second planar arrays 36, 66 that are offset from each other (e.g., parallel with each other). For example, a voltage difference $\Delta V$ may be applied or provided across the electrostatic pad 20 and between the first and second electrodes 32, 62 in order to produce the electric field 83 of alternating positive and negative charges 89, 91. At block 120, the electrostatic pad 20 is brought near or in contact with the sheet 11. At block 130, opposing charges 93 are set up on the sheet 11 due to the electric field 83. And at block 140, the sheet 11 is electrostatically adhered to the electrostatic pad 20. In this method 100, the opposing charges 93 on the sheet 11 may be opposite in polarity from the alternating positive and negative charges 89, 91 induced on the respective first and second electrodes 32, 62.

As one having skill in the relevant art will appreciate, the electrostatic pad 20 of the present disclosure may be presented or arranged in a variety of different configurations and embodiments.

According to one embodiment, an electrostatic pad 20 includes a first planar array 36 of first electrodes 32 arranged in a first pattern 33, and a second planar array 66 of second electrodes 62 arranged in a second pattern 63 that is different from the first pattern 33, wherein the first and second planar arrays 36, 66 are disposed parallel to each other.

In this embodiment, one of the first and second planar arrays 36, 66 may be disposed directly above the other of the first and second planar arrays 36, 66. The first electrodes 32 may have a first polarity 85 and the second electrodes 62 may have a second polarity 87 that is opposite the first polarity 85.

The electrostatic pad 20 may further include a third layer 78 of electrically insulative material 94 sandwiched between the first and second planar arrays 36, 66. The third layer 78 may be in contact with each of the first and second planar arrays 36, 66 of respective first and second electrodes 32, 62, and the third layer 78 may be in contact with respective first and second edges 47, 77 of the first and second electrodes 32, 62. The third layer 78 may have a third layer thickness $T_{78}$ of approximately 25 microns.

The second pattern 63 may be an inverse of the first pattern 33. Additionally, the first and second patterns 33, 63 may be first and second checkerboard patterns 34, 64, respectively.

The electrostatic pad 20 may further include one or more first electrical leads 80 in electrical communication with the first electrodes 32 and one or more second electrical leads 82 in electrical communication with the second electrodes 62. The first and second planar arrays 36, 66 of respective first and second electrodes 32, 62 may be configured to provide a voltage difference $\Delta V$ therebetween, and selected ones of the first and second electrodes 32, 62 may be electrified by the respective one or more first and second electrical leads 80, 82.

The first pattern 33 may include a plurality of first rows 38 and first columns 40 defining mutually orthogonal first and second directions 50, 52, and each of the first electrodes 32 may have a first length $L_1$ as measured along the first direction 50 and a first width $W_1$ as measured along the second direction 52. In this arrangement, first electrodes 32 that are adjacent to each other in the first direction 50 may be spaced apart from each other by a first spacing $S_1$, and first electrodes 32 that are adjacent to each other in the second direction 52 may be spaced apart from each other by a second spacing $S_2$, wherein the first spacing $S_1$ may be equal to the first length $L_1$ plus twice a gap amount G, and wherein the second spacing $S_2$ may be equal to the first width $W_1$ plus twice the gap amount G.

The electrostatic pad 20 may further include a third layer 78 of electrically insulative material 94 sandwiched between the first and second planar arrays 36, 66, wherein the third layer 78 may have a third layer thickness $T_{78}$ and wherein the gap amount G may be approximately ten times the third layer thickness $T_{78}$. Optionally, the gap amount G may be 0.3 millimeters. The first and second spacings $S_1$, $S_2$ may allow greater than 1.3 kV of voltage difference $\Delta V$ to be applied between the first and second planar arrays 36, 66 of respective first and second electrodes 32, 62 without arcing between adjacent ones of the first and second electrodes 32, 62.

First or second electrodes 32, 62 that are diagonally adjacent to each other may be spaced apart from each other by a diagonal spacing $S_d$ that is less than twice the first or second spacing $S_1$, $S_2$. Optionally, the first and second spacings $S_1$, $S_2$ may be equal to each other, with first or second electrodes 32, 62 that are diagonally adjacent to each other being spaced apart from each other by a diagonal spacing $S_d$ that is less than twice the first or second spacing $S_1$, $S_2$. Gaps 79 between adjacent ones of the first electrodes 32 (as viewed in the first and second directions 50, 52) and between adjacent ones of the second electrodes 62 (as viewed in the first and second directions 50, 52) may be filled with electrically insulative material 94.

The first pattern 33 may include a plurality of first filled cells 44 and a plurality of first empty cells 46, wherein each of the first electrodes 32 is disposed in a respective one of the first filled cells 44, and the second pattern 63 may include a plurality of second filled cells 74 and a plurality of second empty cells 76, wherein each of the second electrodes 62 is disposed in a respective one of the second filled cells 74. Each second empty cell 76 may be disposed above a respective one of the first filled cells 44, and each second filled cell 74 may be disposed above a respective one of the first empty cells 46.

According to another embodiment, a method 100 of electrostatic adhesion between an electrostatic pad 20 and a sheet 11 of material includes: (i) at block 110, generating an electric field 83 of alternating positive and negative charges 89, 91 induced on respective first and second electrodes 32, 62 arranged on the electrostatic pad 20 in respective first and second planar arrays 36, 66 that are offset from each other; (ii) at block 120, bringing the electrostatic pad 20 near or in contact with the sheet 11; (iii) at block 130, setting up opposing charges 93 on the sheet 11 due to the electric field

83; and (iv) at block 140, electrostatically adhering the sheet 11 to the electrostatic pad 20.

In this method 100, the opposing charges 93 on the sheet 11 may be opposite in polarity from the alternating positive and negative charges 89, 91 induced on the respective first and second electrodes 32, 62.

According to yet another embodiment, an electrostatic pad 20 includes: (i) a first layer 30 of first electrodes 32 arranged in a first pattern 33 of first filled cells 44 and first empty cells 46, wherein each of the first electrodes 32 is disposed in a respective one of the first filled cells 44; (ii) a second layer 60 of second electrodes 62 arranged in a second pattern 63 of second filled cells 74 and second empty cells 76, wherein each of the second electrodes 62 is disposed in a respective one of the second filled cells 74; and (iii) a third layer 78 of electrically insulative material 94 sandwiched between the first and second layers 30, 60. Here, the second pattern 63 is an inverse of the first pattern 33, and the second layer 60 is oriented above and generally parallel with the first layer 30.

In this embodiment, the first and second patterns 33, 63 may be first and second checkerboard patterns 34, 64, respectively. Each second empty cell 76 may be disposed above a respective one of the first filled cells 44, and each second filled cell 74 may be disposed above a respective one of the first empty cells 46. The third layer 78 may be in contact with each of the first and second layers 30, 60, and the third layer 78 may be in contact with respective first and second edges 47, 77 of the first and second electrodes 32, 62.

The electrostatic pad 20 may further include one or more first electrical leads 80 in electrical communication with the first electrodes 32 and one or more second electrical leads 82 in electrical communication with the second electrodes 62. Additionally, the third layer 78 may have a third layer thickness $T_{78}$ of approximately 25 microns.

In this arrangement, the first and second layers 30, 60 of respective first and second electrodes 32, 62 may be configured to provide a voltage difference $\Delta V$ therebetween. One of the first and second layers 30, 60 may be configured as a positive polarity layer 84, and the other of the first and second layers 30, 60 may be configured as a negative polarity layer 88. Selected ones of the first and second electrodes 32, 62 may be electrified by the respective one or more first and second electrical leads 80, 82.

In this embodiment, the first pattern 33 may include a plurality of first rows 38 and first columns 40 defining mutually orthogonal first and second directions 50, 52, each of the first electrodes 32 may have a first length $L_1$ as measured along the first direction 50 and a first width $W_1$ as measured along the second direction 52, first electrodes 32 that are adjacent to each other in the first direction 50 may be spaced apart from each other by a first spacing $S_1$, and first electrodes 32 that are adjacent to each other in the second direction 52 may be spaced apart from each other by a second spacing $S_2$, wherein the first spacing $S_1$ is equal to the first length $L_1$ plus twice a gap amount G and wherein the second spacing $S_2$ is equal to the first width $W_1$ plus twice the gap amount G. The third layer 78 may have a third layer thickness $T_{78}$, and the gap amount G may be approximately ten times the third layer thickness $T_{78}$. Optionally, the gap amount G may be 0.3 millimeters. The first and second spacings $S_1$, $S_2$ may allow greater than 1.3 kV of voltage difference $\Delta V$ to be applied between the first and second layers 30, 60 of respective first and second electrodes 32, 62 without arcing between adjacent ones of the first and second electrodes 32, 62.

First or second electrodes 32, 62 that are diagonally adjacent to each other may be spaced apart from each other by a diagonal spacing $S_d$ that is less than twice the first or second spacing $S_1$, $S_2$. Additionally, the first and second spacings $S_1$, $S_2$ may be equal to each other, with first or second electrodes 32, 62 that are diagonally adjacent to each other being spaced apart from each other by a diagonal spacing $S_d$ that is less than twice the first or second spacing $S_1$, $S_2$. Further, gaps 79 between adjacent ones of the first electrodes 32 and between adjacent ones of the second electrodes 62 may be filled with electrically insulative material 94.

According to a further embodiment, an electrostatic pad 20 includes a first layer 30 of first electrodes 32 arranged in a first planar array 36, a second layer 60 of second electrodes 62 arranged in a second planar array 66, and a third layer 78 of electrically insulative material 94 sandwiched between the first and second layers 30, 60. The first planar array 36 has a plurality of first rows 38 and a plurality of first columns 40 defining a plurality of first cells 42, wherein each of the first electrodes 32 occupies a respective one of the first cells 42 such that the first electrodes 32 are disposed in a first pattern 33. The second planar array 66 has a plurality of second rows 68 and a plurality of second columns 70 defining a plurality of second cells 72, wherein each of the second electrodes 62 occupies a respective one of the second cells 72 such that the second electrodes 62 are disposed in a second pattern 63 that is an inverse of the first pattern 33, wherein the second layer 60 is disposed above and generally parallel with the first layer 30.

The first and second patterns 33, 63 may be first and second checkerboard patterns 34, 64, respectively. The first pattern 33 may include a plurality of first filled cells 44 and a plurality of first empty cells 46, wherein each of the first electrodes 32 is disposed in a respective one of the first filled cells 44, and the second pattern 63 may include a plurality of second filled cells 74 and a plurality of second empty cells 76, wherein each of the second electrodes 62 is disposed in a respective one of the second filled cells 74. In this arrangement, each second empty cell 76 may be disposed above a respective one of the first filled cells 44, and each second filled cell 74 may be disposed above a respective one of the first empty cells 46.

The electrostatic pad 20 may further include one or more first electrical leads 80 in electrical communication with the first electrodes 32 and one or more second electrical leads 82 in electrical communication with the second electrodes 62. Here, the first and second layers 30, 60 of respective first and second electrodes 32, 62 may be configured to provide a voltage difference ΔV therebetween.

The first rows 38 and first columns 40 may define mutually orthogonal first and second directions 50, 52, each of the first electrodes 32 may have a first length $L_1$ as measured along the first direction 50 and a first width $W_1$ as measured along the second direction 52, first electrodes 32 that are adjacent to each other in the first direction 50 may be spaced apart from each other by a first spacing $S_1$ that is equal to the first length $L_1$ plus twice a gap amount G, and first electrodes 32 that are adjacent to each other in the second direction 52 may be spaced apart from each other by a second spacing $S_2$ that is equal to the first width $W_1$ plus twice the gap amount G. The third layer 78 may have a third layer thickness $T_{78}$, and the gap amount G may be approximately ten times the third layer thickness $T_{78}$. Optionally, the gap amount G may be 0.3 millimeters.

According to yet a further embodiment, an electrostatic pad 20 includes: (i) a first planar array 36 of first filled cells

44 and first empty cells 46 arranged in a first pattern 33, wherein a respective first electrode 32 is disposed within each of the first filled cells 44, thereby defining a first layer 30 of first electrodes 32; (ii) a second planar array 66 of second filled cells 74 and second empty cells 76 arranged in a second pattern 63 that is an inverse of the first pattern 33, wherein a respective second electrode 62 is disposed within each of the second filled cells 74, thereby defining a second layer 60 of second electrodes 62, wherein the second layer 60 is oriented above and generally parallel with the first layer 30; and (iii) a third layer 78 of electrically insulative material 94 sandwiched between and in contact with the first and second layers 30, 60. Here, each second empty cell 76 is disposed above a respective one of the first filled cells 44, and each second filled cell 74 is disposed above a respective one of the first empty cells 46.

The electrostatic pad 20 may further include one or more first electrical leads 80 in electrical communication with the first electrodes 32 and one or more second electrical leads 82 in electrical communication with the second electrodes 62. In this arrangement, the first and second layers 30, 60 of respective first and second electrodes 32, 62 may be configured to provide a voltage difference ΔV therebetween.

In this embodiment, the first and second patterns 33, 63 may be first and second checkerboard patterns 34, 64, respectively. The first pattern 33 may include a plurality of first rows 38 and first columns 40 defining mutually orthogonal first and second directions 50, 52, each of the first electrodes 32 may have a first length $L_1$ as measured along the first direction 50 and a first width $W_1$ as measured along the second direction 52, first electrodes 32 that are adjacent to each other in the first direction 50 may be spaced apart from each other by a first spacing $S_1$ that is equal to the first length $L_1$ plus twice a gap amount G, and first electrodes 32 that are adjacent to each other in the second direction 52 may be spaced apart from each other by a second spacing $S_2$ that is equal to the first width $W_1$ plus twice the gap amount G. The third layer 78 may have a third layer thickness $T_{78}$, and the gap amount G may be approximately ten times the third layer thickness $T_{78}$. Optionally, the gap amount G may be 0.3 millimeters.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "mostly", "mainly", "for the most part", "to a significant extent", "to a large degree" and/or "at least 51 to 99% out of a possible extent of 100%", and do not necessarily mean "perfectly", "completely", "strictly", "entirely" or "100%". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. An electrostatic pad, comprising:
a first planar array of first electrodes arranged in a first pattern, wherein the first electrodes that are adjacent to each other in the first planar array are spaced apart from each other, wherein the first electrodes have a first polarity;
a second planar array of second electrodes arranged in a second pattern that is different from the first pattern, wherein the second electrodes that are adjacent to each other in the second planar array are spaced apart from each other, wherein the second electrodes have a second polarity that is opposite the first polarity; and
a third layer of electrically insulative material sandwiched between the first and second planar arrays; and
wherein the second electrodes of the second planar array are offset from the first electrodes of the first planar array in a first direction and a second direction such that the second electrodes are spaced from neighboring first electrodes in the first direction by a first gap and spaced from neighboring first electrodes in the second direction by a second gap.

2. The electrostatic pad of claim 1, wherein one of the first and second planar arrays is disposed above the other of the first and second planar arrays.

3. The electrostatic pad of claim 1 wherein the first and second planar arrays are disposed parallel to each other.

4. The electrostatic pad of claim 3, wherein the third layer is in contact with each of the first and second planar arrays of respective first and second electrodes.

5. The electrostatic pad of claim 3, wherein the third layer is in contact with respective first and second edges of the first and second electrodes.

6. The electrostatic pad of claim 1, wherein the second pattern is an inverse of the first pattern.

7. The electrostatic pad of claim 1, wherein the first and second patterns are first and second checkerboard patterns, respectively.

8. The electrostatic pad of claim 1, further comprising:
one or more first electrical leads in electrical communication with the first electrodes and one or more second electrical leads in electrical communication with the second electrodes.

9. The electrostatic pad of claim 8, wherein the first and second planar arrays of respective first and second electrodes are configured to provide a voltage difference therebetween.

10. The electrostatic pad of claim 8, wherein selected ones of the first and second electrodes may be electrified by the respective one or more first and second electrical leads.

11. The electrostatic pad of claim 1, wherein:
the first pattern includes a plurality of first rows and first columns defining the first and second directions as mutually orthogonal;
each of the first electrodes has a first length as measured along the first direction and a first width as measured along the second direction;

the first electrodes that are adjacent to each other in the first direction are spaced apart from each other by a first spacing, and the first electrodes that are adjacent to each other in the second direction are spaced apart from each other by a second spacing;
wherein the first spacing is equal to the first length plus twice a gap amount; and
wherein the second spacing is equal to the first width plus twice the gap amount.

12. The electrostatic pad of claim 11, further comprising:
a third layer of electrically insulative material sandwiched between the first and second planar arrays, wherein the third layer has a third layer thickness and wherein the gap amount is approximately ten times the third layer thickness.

13. The electrostatic pad of claim 11, wherein the gap amount is 0.3 millimeters.

14. The electrostatic pad of claim 11, wherein the first and second spacings allow greater than 1.3 kV of voltage difference to be applied between the first and second planar arrays of respective first and second electrodes without arcing between adjacent ones of the first and second electrodes.

15. The electrostatic pad of claim 11, wherein first or second electrodes that are diagonally adjacent to each other are spaced apart from each other by a diagonal spacing that is less than twice the first or second spacing.

16. The electrostatic pad of claim 11, wherein the first and second spacings are equal to each other, and wherein first or second electrodes that are diagonally adjacent to each other are spaced apart from each other by a diagonal spacing that is less than twice the first or second spacing.

17. The electrostatic pad of claim 1, wherein gaps between adjacent ones of the first electrodes and between adjacent ones of the second electrodes are filled with electrically insulative material.

18. The electrostatic pad of claim 1, wherein:
the first pattern includes a plurality of first filled cells and a plurality of first empty cells, wherein each of the first electrodes is disposed in a respective one of the first filled cells;
the second pattern includes a plurality of second filled cells and a plurality of second empty cells, wherein each of the second electrodes is disposed in a respective one of the second filled cells; and
each second empty cell is disposed above a respective one of the first filled cells, and
each second filled cell is disposed above a respective one of the first empty cells.

19. A method of electrostatic adhesion between an electrostatic pad and a sheet of material, comprising:
generating an electric field of alternating positive and negative charges induced on respective first and second electrodes arranged on the electrostatic pad in respective first and second planar arrays that are offset from each other, wherein the second electrodes that are adjacent to each other in the second planar array are spaced apart from each other, wherein the electrostatic pad comprises a third layer of electrically insulative material sandwiched between the first and first and second planar arrays;
bringing the electrostatic pad near or in contact with the sheet;
setting up opposing charges on the sheet due to the electric field; and
electrostatically adhering the sheet to the electrostatic pad; and wherein the offset between the second electrodes of the second planar array and the first electrodes of the first planar array is in a first direction and a second direction such that the second electrodes are spaced from neighboring first electrodes in the first direction by a first gap and spaced from neighboring first electrodes in the second direction by a second gap.

20. The method of claim 19, wherein the opposing charges on the sheet are opposite in polarity from the alternating positive and negative charges induced on the respective first and second electrodes.

21. An electrostatic pad, comprising:
a first layer of first electrodes arranged in a first pattern of first filled cells and first empty cells, wherein each of the first electrodes is disposed in a respective one of the first filled cells, wherein the first electrodes that are adjacent to each other in the first layer are spaced apart from each other;
a second layer of second electrodes arranged in a second pattern of second filled cells and second empty cells, wherein each of the second electrodes is disposed in a respective one of the second filled cells, wherein the second electrodes that are adjacent to each other in the second layer are spaced apart from each other; and
a third layer of electrically insulative material sandwiched between the first and second layers;
wherein the second pattern is an inverse of the first pattern, and wherein the second layer is oriented above and generally parallel with the first layer; and
wherein the second electrodes of the second layer are offset from the first electrodes of the first layer in a first direction and a second direction such that the second electrodes are spaced from neighboring first electrodes in the first direction by a first gap and spaced from neighboring first electrodes in the second direction by a second gap.

22. The electrostatic pad of claim 21, wherein the first and second patterns are first and second checkerboard patterns, respectively.

23. The electrostatic pad of claim 21, wherein each second empty cell is disposed above a respective one of the first filled cells, and each second filled cell is disposed above a respective one of the first empty cells.

24. The electrostatic pad of claim 21, wherein the third layer is in contact with each of the first and second layers.

25. The electrostatic pad of claim 21, further comprising:
one or more first electrical leads in electrical communication with the first electrodes and one or more second electrical leads in electrical communication with the second electrodes.

26. The electrostatic pad of claim 25, wherein the first and second layers of respective first and second electrodes are configured to provide a voltage difference therebetween.

27. The electrostatic pad of claim 25, wherein one of the first and second layers is configured as a positive polarity layer, and the other of the first and second layers is configured as a negative polarity layer.

28. The electrostatic pad of claim 25, wherein selected ones of the first and second electrodes may be electrified by the respective one or more first and second electrical leads.

29. The electrostatic pad of claim 21, wherein the third layer is in contact with respective first and second edges of the first and second electrodes.

30. The electrostatic pad of claim 21, wherein:
the first pattern includes plurality of first rows and first columns defining the first and second directions as mutually orthogonal;

each of the first electrodes has a first length as measured along the first direction and a first width as measured along the second direction;
the first electrodes that are adjacent to each other in the first direction are spaced apart from each other by a first spacing, and the first electrodes that are adjacent to each other in the second direction are spaced apart from each other by a second spacing;
wherein the first spacing is equal to the first length plus twice a gap amount; and
wherein the second spacing is equal to the first width plus twice the gap amount.

31. The electrostatic pad of claim 30, wherein the third layer has a third layer thickness and the gap amount is approximately ten times the third layer thickness.

32. The electrostatic pad of claim 30, wherein the gap amount is 0.3 millimeters.

33. The electrostatic pad of claim 30, wherein the first and second spacings allow greater than 1.3 kV of voltage difference to be applied between the first and second layers of respective first and second electrodes without arcing between adjacent ones of the first and second electrodes.

34. The electrostatic pad of claim 30, wherein the first and second spacings are equal to each other, and wherein first or second electrodes that are diagonally adjacent to each other are spaced apart from each other by a diagonal spacing that is less than twice the first or second spacing.

35. The electrostatic pad of claim 30, wherein first or second electrodes that are diagonally adjacent to each other are spaced apart from each other by a diagonal spacing that is less than twice the first or second spacing.

36. The electrostatic pad of claim 21, wherein the third layer has a third layer thickness of approximately 25 microns.

37. The electrostatic pad of claim 21, wherein gaps between adjacent ones of the first electrodes and between adjacent ones of the second electrodes are filled with electrically insulative material.

38. An electrostatic pad, comprising:
a first layer of first electrodes arranged in a first planar array having a plurality of first rows and a plurality of first columns defining a plurality of first cells, wherein the first electrodes that are adjacent to each other in the first layer are spaced apart from each other, wherein each of the first electrodes occupies a respective one of the first cells such that the first electrodes are disposed in a first pattern;
a second layer of second electrodes arranged in a second planar array having a plurality of second rows and a plurality of second columns defining a plurality of second cells, wherein the second electrodes that are adjacent to each other in the second layer are spaced apart from each other, wherein each of the second electrodes occupies a respective one of the second cells such that the second electrodes are disposed in a second pattern that is an inverse of the first pattern, wherein the second layer is disposed above and generally parallel with the first layer; and
a third layer of electrically insulative material sandwiched between the first and second layers; and
wherein the second electrodes of the second planar array are offset from the first electrodes of the first planar array in a first direction and a second direction such that the second electrodes are spaced from neighboring first electrodes in the first direction by a first gap and spaced from neighboring first electrodes in the second direction by a second gap.

39. The electrostatic pad of claim 38, wherein the first and second patterns are first and second checkerboard patterns, respectively.

40. The electrostatic pad of claim 38, wherein:

the first pattern includes a plurality of first filled cells and a plurality of first empty cells, wherein each of the first electrodes is disposed in a respective one of the first filled cells;

the second pattern includes a plurality of second filled cells and a plurality of second empty cells, wherein each of the second electrodes is disposed in a respective one of the second filled cells; and each second empty cell is disposed above a respective one of the first filled cells, and each second filled cell is disposed above a respective one of the first empty cells.

41. The electrostatic pad of claim 38, further comprising:

one or more first electrical leads in electrical communication with the first electrodes and one or more second electrical leads in electrical communication with the second electrodes.

42. The electrostatic pad of claim 41, wherein the first and second layers of respective first and second electrodes are configured to provide a voltage difference therebetween.

43. The electrostatic pad of claim 38, wherein the first rows and first columns define the first and second directions as mutually orthogonal, each of the first electrodes has a first length as measured along the first direction and a first width as measured along the second direction, the first electrodes that are adjacent to each other in the first direction are spaced apart from each other by a first spacing that is equal to the first length plus twice a gap amount, and the first electrodes that are adjacent to each other in the second direction are spaced apart from each other by a second spacing is equal to the first width plus twice the gap amount.

44. The electrostatic pad of claim 43, wherein the third layer has a third layer thickness, and the gap amount is approximately ten times the third layer thickness.

45. The electrostatic pad of claim 43, wherein the gap amount is 0.3 millimeters.

46. An electrostatic pad, comprising:

a first planar array of first filled cells and first empty cells arranged in a first pattern, wherein a respective first electrode is disposed within each of the first filled cells, thereby defining a first layer of first electrodes, wherein the first electrodes that are adjacent to each other in the first planar array are spaced apart from each other;

a second planar array of second filled cells and second empty cells arranged in a second pattern that is an inverse of the first pattern, wherein a respective second electrode is disposed within each of the second filled cells, thereby defining a second layer of second electrodes, wherein the second layer is oriented above and generally parallel with the first layer, wherein the second electrodes that are adjacent to each other in the second planar array are spaced apart from each other; and a third layer of electrically insulative material sandwiched between and in contact with the first and second layers;

wherein each second empty cell is disposed above a respective one of the first filled cells, and each second filled cell is disposed above a respective one of the first empty cells; and wherein the second electrodes of the second planar array are offset from the first electrodes of the first planar array in a first direction and a second direction such that the second electrodes are spaced from neighboring first electrodes in the first direction by a first gap and spaced from neighboring first electrodes in the second direction by a second gap.

47. The electrostatic pad of claim 46, wherein the first and second patterns are first and second checkerboard patterns, respectively.

48. The electrostatic pad of claim 46, further comprising:

one or more first electrical leads in electrical communication with the first electrodes and one or more second electrical leads in electrical communication with the second electrodes.

49. The electrostatic pad of claim 48, wherein the first and second layers of respective first and second electrodes are configured to provide a voltage difference therebetween.

50. The electrostatic pad of claim 46, wherein the first pattern includes plurality of first rows and first columns defining the first and second directions as mutually orthogonal, each of the first electrodes has a first length as measured along the first direction and a first width as measured along the second direction, the first electrodes that are adjacent to each other in the first direction are spaced apart from each other by a first spacing that is equal to the first length plus twice a gap amount, and the first electrodes that are adjacent to each other in the second direction are spaced apart from each other by a second spacing that is equal to the first width plus twice the gap amount.

51. The electrostatic pad of claim 50, wherein the third layer has a third layer thickness and the gap amount is approximately ten times the third layer thickness.

52. The electrostatic pad of claim 50, wherein the gap amount is 0.3 millimeters.

53. The method of claim 19, the first electrodes are arranged in a first pattern comprising a plurality of first rows and first columns;

each of the first electrodes has a first length as measured along the first direction and a first width as measured along the second direction;

the first electrodes that are adjacent to each other in the first direction are spaced apart from each other by a first spacing is equal to the first length plus twice a gap amount; and the first electrodes that are adjacent to each other in the second direction are spaced apart from each other by a second spacing that is equal to the first width plus twice the gap amount.

54. The electrostatic pad of claim 21, wherein the first electrodes have a first polarity and the second electrodes have a second polarity that is opposite the first polarity.

* * * * *